(12) United States Patent
Weyandt

(10) Patent No.: US 6,913,236 B2
(45) Date of Patent: Jul. 5, 2005

(54) COMPONENT MOUNTING TRACK

(75) Inventor: David Alan Weyandt, Harrisburg, PA (US)

(73) Assignee: Phoenix Contact Inc., Middletown, PA (US)

( * ) Notice: Subject to any disclaimer, the term of this patent is extended or adjusted under 35 U.S.C. 154(b) by 0 days.

(21) Appl. No.: 10/603,031

(22) Filed: Jun. 24, 2003

(65) Prior Publication Data
US 2004/0262468 A1 Dec. 30, 2004

(51) Int. Cl.$^7$ .................................................. E04C 3/00
(52) U.S. Cl. ........................ 248/300; 439/110; 439/532
(58) Field of Search ..................... 52/729.5; 248/200, 248/223.41, 475.1, 300, 694, 906; 439/532, 114, 110

(56) References Cited

U.S. PATENT DOCUMENTS

| 3,456,231 | A |   | 7/1969  | Paullus et al. ............... 339/60 |
| 3,554,236 | A |   | 1/1971  | Rhodes ....................... 138/117 |
| 3,573,373 | A |   | 4/1971  | Mullin et al. ................ 179/98 |
| 4,712,232 | A |   | 12/1987 | Rodgers ....................... 379/329 |
| 4,773,867 | A |   | 9/1988  | Keller et al. .................. 439/49 |
| 5,023,404 | A | * | 6/1991  | Hudson et al. ................ 174/97 |
| 5,035,645 | A |   | 7/1991  | Siemon et al. ............... 439/532 |
| 5,794,795 | A |   | 8/1998  | Stemmons ..................... 211/26 |
| 5,813,751 | A | * | 9/1998  | Shaffer ........................ 362/249 |
| 5,833,417 | A | * | 11/1998 | Sargent et al. ................ 411/85 |
| 5,957,819 | A | * | 9/1999  | Cortesi ........................ 482/121 |
| 6,481,678 | B1 |   | 11/2002 | Chong .................... 248/220.42 |
| 6,484,997 | B1 | * | 11/2002 | Edwards et al. ......... 248/224.51 |
| 6,521,837 | B2 | * | 2/2003  | Hilgert et al. ............ 174/99 B |
| 6,536,730 | B1 | * | 3/2003  | Baer ........................... 248/304 |

OTHER PUBLICATIONS

Drawing of prior art rail.

* cited by examiner

Primary Examiner—Jonathon Szumny
(74) Attorney, Agent, or Firm—Hooker & Habib, P.C.

(57) ABSTRACT

A mounting track for electrical components including a base that is designed to attach a track to a support surface. A wall extends from the base to a mounting rail. The rail includes a number of large tool receiving apertures located directly above mounting apertures in the base to facilitate mounting of the track to a support surface. The apertures in the wall facilitate routing wires between components on the mounting rail.

5 Claims, 3 Drawing Sheets

COMPONENT MOUNTING TRACK

FIELD OF THE INVENTION

The invention relates to an elongate track for mounting electrical components in an electrical control panel.

DESCRIPTION OF THE PRIOR ART

Electrical control panels hold a large number of electrical components which must be wired together. The components include terminal blocks, power supplies, relays and surge suppressors necessary for supplying electrical systems with power and data lines and the like. To facilitate mounting the components in a panel and routing and organizing the wires leading to and from the components, different mounting tracks have been developed. The tracks support the components a distance from the panel to facilitate mounting and arranging the components and positioning wires that run between the components.

FIG. 1 shows a prior art extruded mounting track 10. Track 10 has a component mounting rail 12 joining wall 14 and mounting foot 16 extending to one side of wall 14. Components are mounted on rail 12. Wires from the components are positioned to either side of joining wall 14. The track 10 is mounted to a flat surface, typically the back wall of a control panel, by screws or other fasteners extending through apertures 18 in foot 16.

Mounting the track to a flat surface presents difficulties. The apertures 18 are positioned offset from the center of rail 12. A large tool such as an oversized screw driver or standard nut driver cannot directly access the apertures to drive a screw into the panel wall. Drivers must apply force to fasteners at a non-perpendicular angle, increasing the amount of time needed for mounting the track and increasing the chance that a fastener will be driven into the panel at a non-perpendicular angle or that the fastener will become damaged in the process.

Accordingly, there is a need for an electrical component mounting rail having centered mounting slots which allow direct access to mounting apertures and facilitate positioning wires extending from mounted components.

SUMMARY OF THE INVENTION

The invention is a mounting track that allows direct, perpendicular access to the mounting apertures in the track foot by a fastening tool. Access is achieved through openings on the component mounting rail located directly above the mounting apertures. These openings are sufficiently large to allow a screwdriver or other fastener mounting tool direct access to the mounting apertures at angles normal to the track's mounting foot. The wall joining the track's foot and rail is offset from the lateral center of the rail and foot to permit a fastener to access the apertures. The offset placement of the wall also creates a cavity for routing wires under the track. Large rail openings are provided in the wall to allow wire routing through the mounting rail.

DESCRIPTION OF THE PREFERRED EMBODIMENTS

Figure 1:
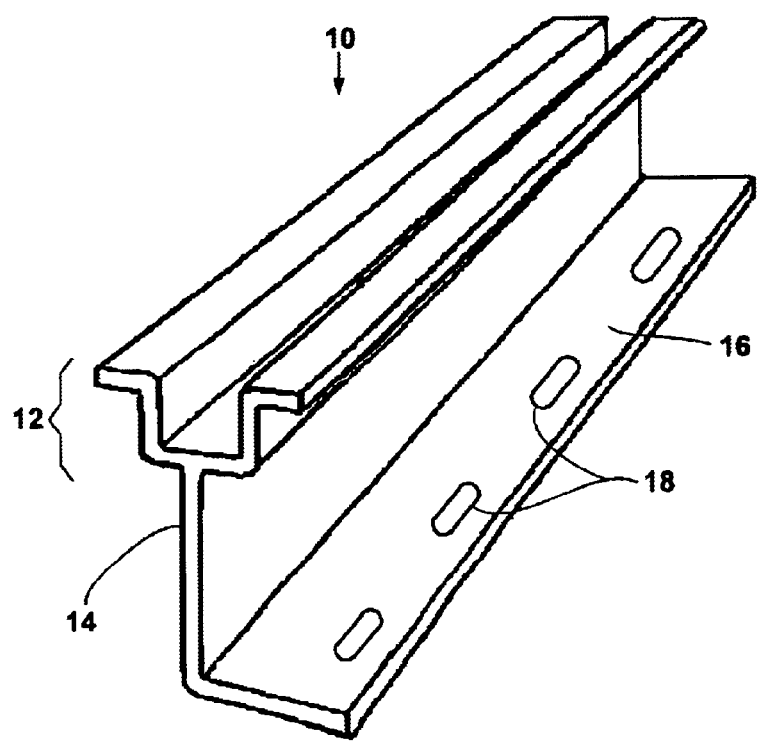
FIG. 1 illustrates a prior art mounting track.

In a preferred embodiment of the invention, the track 20 is formed from an aluminum extrusion having a uniform transverse cross section and has a mounting rail 22, a flat mounting foot 24 below the rail and a vertical wall 26, joining rail 22 to foot 24. Wall 26 extends from one side of foot 24 to rail 22, preferably at a right angle to the foot and the rail.

Wall 26 joins rail 22 at rail base 30. Base 30 is above and parallel to foot 24. Vertical sidewalls 32 extend up from the sides of base 30 at right angles, away from the foot and are parallel to wall 26. Flanges 34 extend outward from the upper edges of vertical sidewalls 32 and parallel to base 30 to member edges 35. The configuration of rail 22 is conventional and allows electrical components to be mounted upon it.

Wall 26 joins rail base 30 at a position offset from the lateral center of the rail. The base 30, wall 26, and foot 24 define a cavity 36 through which the wires connected to components mounted on the rail may be routed.

Figure 5:
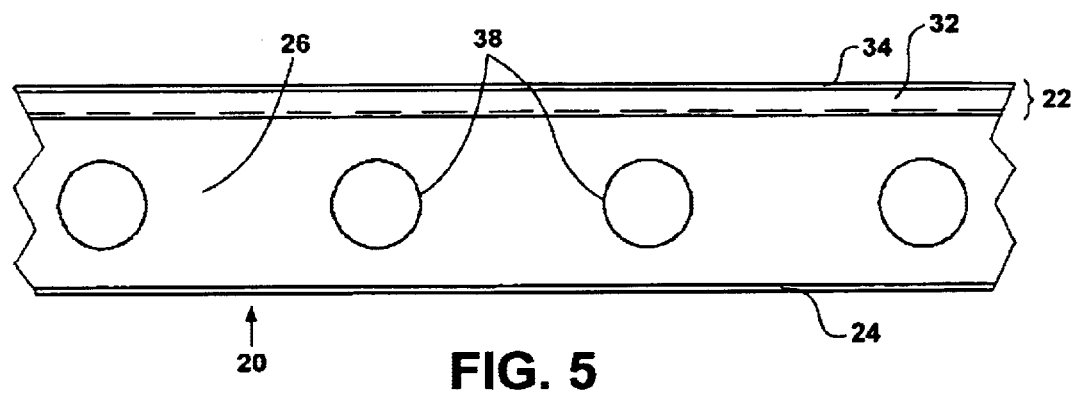
FIG. 5 is a side view of the disclosed track.

FIG. 5 shows a side view of track 20. Apertures 38 are spaced at regular intervals along wall 26 to allow wires in cavity 36 to be routed to either side of wall 26.

Regularly spaced mounting apertures 28 extend through foot 24 to permit mounting track 20 to a flat surface. Mounting apertures 28 are positioned under rail base 30 and adjacent to wall 26.

Figure 2:
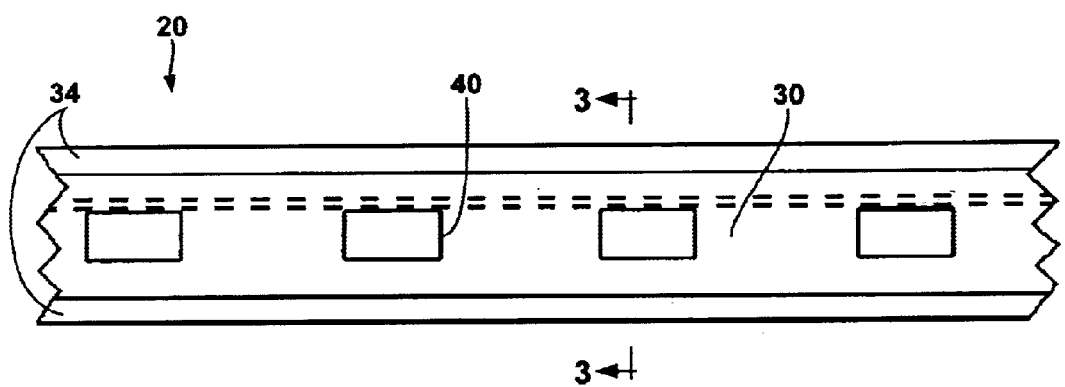
FIG. 2 is a top view of the disclosed track.
Figure 3:
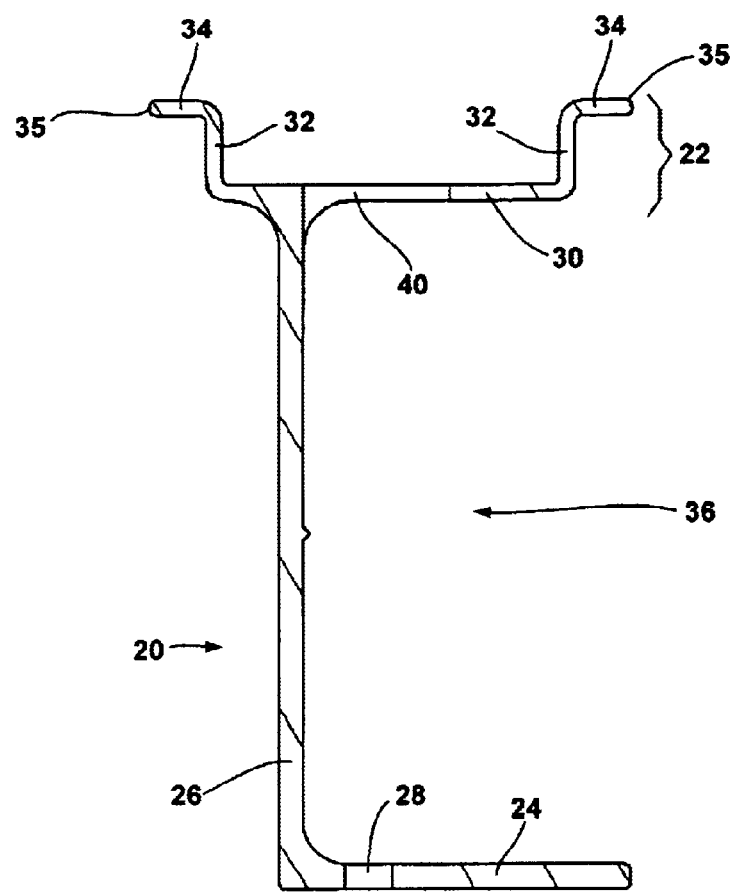
FIG. 3 is a sectional view taken along line 3—3 of FIG. 2.

FIG. 2 is a top view of track 20. Large rectangular track apertures 40 are spaced regularly along base 30. Apertures 40 are positioned directly above smaller foot apertures 28. Track apertures 40 are positioned adjacent to and are contiguous with wall 26 with a major axis running along the length of the track and a traverse minor axis. Track apertures 40 are larger than foot apertures 28 and are large enough to accept fastener driving tools.

Figure 4:
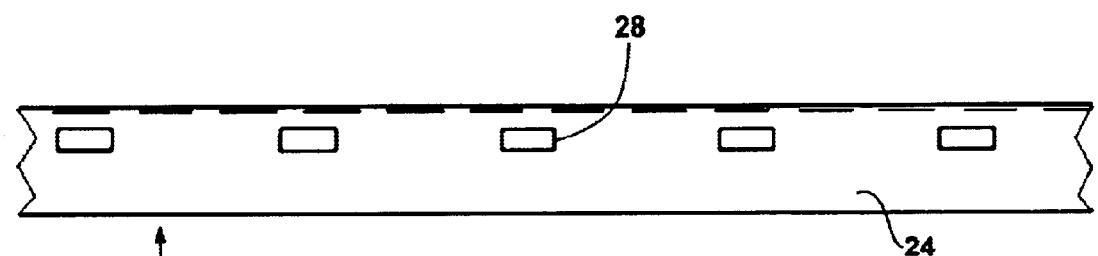
FIG. 4 is a bottom view of the disclosed track.

FIG. 4 shows the bottom of the track. Foot apertures 28 are rectangular with a major axis of the rectangle running along the length of the track and parallel to wall 26 and a traverse minor axis. Apertures 28 allows flexibility in mounting track 20 to a support surface with pre-drilled holes. The pre-drilled holes may not conform to exact locations on the rail for mounting the rail to a support surface. Thus, the foot apertures 28 are slot-shaped to allow shifting of the track to fit misaligned holes in the panel. Track apertures 40 are similarly slot shaped to assure that a tool can be held perpendicular during screwing of a fastener into a wall panel regardless of where a fastener is positioned with in a given foot aperture.

Figure 6:
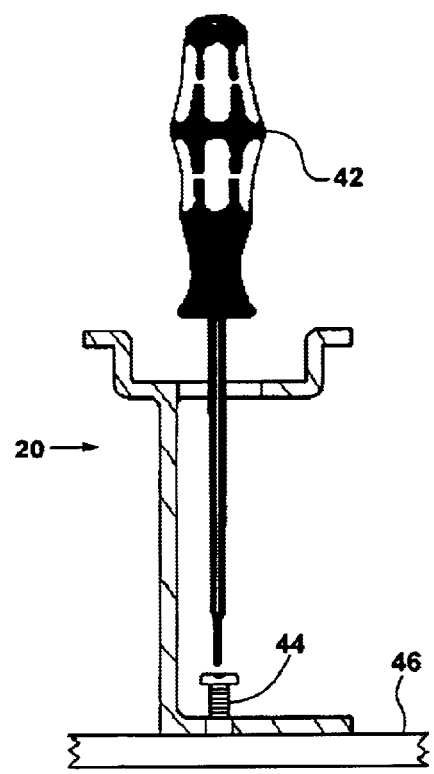
FIG. 6 is a sectional view of the disclosed track, showing a screwdriver mounting the track to a panel wall.

FIG. 6 shows the track being mounted to a support surface. A screwdriver 42 extends through aperture 40 in rail 22 to reach foot aperture 28. Screwdriver 42 is held at a right angle to foot 24 and may engage a screw 44 squarely to mount track 20 to surface 46.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim as my invention:

1. A mounting track for supporting electrical components, the track comprising an elongate one-piece body of generally uniform transverse cross section, the track having a horizontal width and a vertical height, the track including:

an elongate, flat foot having opposed parallel foot edges and a plurality of mounting apertures extending through the foot for attaching the track to a support surface, the mounting apertures spaced along the foot and located adjacent one foot edge;

an elongate wall member joined to the flat foot and extending generally perpendicularly away from the flat foot adjacent said one foot edge, said wall member located between said foot edge and said mounting apertures;

an elongate component mounting rail joined to the top of the wall member and overlying the foot, the rail comprising a generally flat base above the foot and two vertically offset mounting members each located above and to one side of the base, each mounting member having a member edge, the rail having a midpoint equidistant from each member edge, each mounting aperture in vertical alignment with the midpoint of the rail, the rail having a plurality of access apertures extending through the base, each access aperture overlying a mounting aperture in the foot and having an area larger than the area of the mounting aperture.

2. The mounting track as in claim 1 wherein each mounting aperture and each access aperture is proximate the wall member.

3. The mounting track as in claim 1 wherein the foot, wall member and base define a three sided interior wire-routing cavity.

4. The mounting track as in claim 3 wherein a foot edge distal to the wall member is in vertical alignment with a one of said member edges.

5. The mounting track as in claim 4 wherein the wall member has one or more wall apertures extending through the wall member.

\* \* \* \* \*

UNITED STATES PATENT AND TRADEMARK OFFICE
CERTIFICATE OF CORRECTION

| | | |
|---|---|---|
| PATENT NO. | : 6,913,236 B2 | Page 1 of 1 |
| APPLICATION NO. | : 10/603031 | |
| DATED | : July 5, 2005 | |
| INVENTOR(S) | : David A. Weyandt | |

It is certified that error appears in the above-identified patent and that said Letters Patent is hereby corrected as shown below:

Column 4, line 13, replace "with a one" with --with one--.

Signed and Sealed this

Sixth Day of February, 2007

JON W. DUDAS
*Director of the United States Patent and Trademark Office*